United States Patent [19]

Fisch et al.

[11] Patent Number: 5,270,383
[45] Date of Patent: Dec. 14, 1993

[54] PREPARATION OF AQUEOUS POLYURETHANE DISPERSIONS

[75] Inventors: Herbert Fisch, Wachenheim; Lothar Maempel, Bruehl, both of Fed. Rep. of Germany

[73] Assignee: BASF Aktiengesellschaft, Ludwigshafen, Fed. Rep. of Germany

[21] Appl. No.: 956,761

[22] PCT Filed: Jul. 25, 1991

[86] PCT No.: PCT/EP91/01391

§ 371 Date: Dec. 14, 1992

§ 102(e) Date: Dec. 14, 1992

[87] PCT Pub. No.: WO92/02566

PCT Pub. Date: Feb. 20, 1992

[30] Foreign Application Priority Data

Aug. 2, 1990 [DE] Fed. Rep. of Germany ....... 4024567

[51] Int. Cl.$^5$ .............................................. C08L 75/04
[52] U.S. Cl. .................... 524/812; 524/815; 524/827; 524/832; 524/834; 524/839; 524/840
[58] Field of Search .............. 524/812, 815, 827, 832, 524/834, 839, 840

[56] References Cited

FOREIGN PATENT DOCUMENTS

| | | |
|---|---|---|
| 0000548 | 2/1979 | European Pat. Off. . |
| 0103174 | 3/1984 | European Pat. Off. . |
| 0272566 | 6/1988 | European Pat. Off. . |
| 0382052 | 8/1990 | European Pat. Off. . |
| 0404371 | 12/1990 | European Pat. Off. . |
| 3903538 | 8/1990 | Fed. Rep. of Germany . |

OTHER PUBLICATIONS

Adhasion, vol. 3, pp. 7-12, 1984, B. Kujawa-Pencek, et al.
Progress in Organic Coatings, vol. 9, pp. 281-340, 1981, D. Dieterich.
D. Dieterich, "Angerwandte Makromolekulare Chemie", vol. 89, pp. 133-165, 1981.
Kunststoff Hanbuch, vol. 7, pp. 591-592, Jul., 1983.

*Primary Examiner*—Maurice J. Welsh
*Attorney, Agent, or Firm*—Oblon, Spivak, McClelland, Maier & Neustadt

[57] ABSTRACT

Aqueous polyurethane dispersions are prepared by reacting (a) dihydroxy compounds having a molecular weight of from 500 to 5,000, (b) diisocyanates and, if required, (c) chain extenders having at least two hydrogen atoms which are reactive toward isocyanate groups and a molecular weight of less than 300 in the melt or in the presence of a water-miscible, inert organic solvent (S) which boils below 100° C. to give a prepolymer having terminal isocyanate groups, then reacting the prepolymer with (d) salts of aliphatic aminocarboxylic or aminosulfonic acids or tertiary ammonium salts and dispersing the resulting polyurethane in water, by a process in which, before the polyurethane obtained is dispersed in water, from 5 to 60 parts by weight, based on 100 parts by weight of the polyurethane, of a polymer (p) [sic]which is dissolved in a solvent (S') boiling below 100° C. is admixed, with the exception of condensates of phenol with formaldehyde and of epichlorohydrin with bisphenol A, and said polyurethane dispersions are used as adhesives or coating materials.

5 Claims, No Drawings

PREPARATION OF AQUEOUS POLYURETHANE DISPERSIONS

The present invention relates to aqueous polyurethane dispersions obtainable by reacting (a) dihydroxy compounds having a molecular weight of from 500 to 5,000, (b) diisocyanates and, if required, (c) chain extenders having at least two hydrogen atoms which are reactive toward isocyanate groups and a molecular weight of less than 300, which do not have any salt groups, in the melt or in the presence of a water-miscible, organic solvent (S) which is inert toward isocyanate groups and boils below 100° C. to give a prepolymer having terminal isocyanate groups, then reacting the prepolymer with (d) salts of aliphatic aminocarboxylic or aminosulfonic acids or tertiary ammonium salts, which contain one or more hydrogen atoms which are reative toward isocyanate, the molar ratio of the components a : b : (c+d) being from 1:2:1 to 1:14:13 and dispersing the resulting polyuret hane in water, wherein, before the polyurethane obtained is dispersed in water, from 5 to 60 parts by weight, based on 100 parts by weight of the polyurethane, of a polymer (P) selected from the group consisting of polyvinyl acetate [sic], polyvinyl chloride, polymethyl methacrylate, polyamide, polyether, in particular polyetherdiol, polyester resin, in particular polyesterdiol, polurethane free of salt groups and phenacrylate and a mixture of at least two of these substances which is dissolved in a water-miscible solvent (S') inert toward isocyanate and boiling below 100° C. is admixed.

The present invention furthermore relates to the use of the products, i.e. of the elastomeric polyurethanes, as adhesives or coating materials.

In this context, it should first be stated that it is known that the relevant polyurethane elastomers can be used as adhesives; cf. for example Kunststoff-Handbuch, Volume 7, July 1983, pages 588 to 590.

It is also known that, in the case of the polyurethanes known to date as adhesives, the low solubility in suitable solvents (acetone and methyl ethyl ketone) is a disadvantage, and large amounts of solvent therefore have to be evaporated off during adhesive bonding. Attempts have therefore long been made to convert elastomers into the form of aqueous dispersions; cf. for example the Kunststoff-Handbuch cited above, page 591 et seq. Aqueous dispersions are usually stabilized by means of incorporated ion groups. The disadvantage of these dispersions is that relatively high activation temperatures (80° C. or higher) are required during adhesive bonding, in order to bring the dry adhesive film to the consistency required for adhesive bonding, or that the initial adhesive strengths of the system which were obtained at a given activation temperature are too low. The term initial adhesive strengths is understood as meaning the adhesive strengths measured immediately after brief activation and pressing together of the surfaces to be bonded.

It is also known that, in the case of polyurethane adhesives which are processed from organic solution, the initial adhesive strength can be improved by adding certain resins; cf. for example B. KujawaPencek et al., Adhäsion (1984)3, 7-12.

There is no indication of an improved process for the preparation of polyurethane dispersions.

Aqueous polyurethane dispersions can be prepared by various methods; cf. for example D. Dieterich, Progress in Organic Coatings, 9 (1981), 281-340. The acetone process is relatively simple Here, a polyurethane ionomer is prepared in a plurality of steps in solution in acetone and then converted into an aqueous dispersion by adding water. The acetone still dissolved in the water is generally distilled off at the end under reduced pressure.

D. Dieterich, Angewandte Makromolekulare Chemie 89 (1981), 133-165, Kunststoff-Handbuch, Volume 7, Jul. 1983, page 591, and B. Kujawa-Pencek et al., Adhäsion (1984) 3, 7-12, disclose that polymers dispersed in water can be added to aqueous polyurethane dispersions. However, these dispersions are frequently unstable. The products tend to exhibit loss of adhesion or poor adhesive strength.

DE-A 3903538 describes the preparation of aqueous polyurethane dispersions with the addition of solutions of phenol/formaldehyde or epichlorohydrin/bisphenol A condensates.

It is an object of the present invention to prepare aqueous polyurethane dispersions which have good adhesive strength even at the beginning or after heat treatment and can be readily processed.

We have found that this object is achieved by the abovementioned aqueous polyurethane dispersion.

The use of the aqueous polyurethane dispersions as adhesives or as coating materials has also been found.

Preferred embodiments of the invention are described in the subclaims.

The polymer (P) is preferably used in amounts of from 10 to 50 parts by weight, based on 100 parts by weight of the polyurethane. It is polyvinyl acetate, polyvinyl chloride or polymethyl methacrylate, or is polyamide, a polyether, in particular a polyetherdiol, a polyester resin, in particular a polyesterdiol, a polyurethane free of salt groups or a phenacrylate. Mixtures of at least two of these polymers may also be used.

Preferred polyvinyl acetates are the homopolymers of vinyl acetate. Its copolymers which contain up to 10% by weight of comonomers such as vinyl laurate, vinyl stearate or, preferably, esters of (meth)acrylic acid, fumaric acid or maleic acid with $C_1$-$C_8$-alkanols, such as methanol, n-butanol or 2-ethylhexanol, may also be used. The polymers usually have a K value of from 45 to 60, measured at 25° C. in cyclohexanone according to DIN 53,726. Polyvinyl chloride is generally understood as meaning the homopolymers of vinyl chloride and its copolymers which contain up to 10% by weight of comonomers, such as ethylene or vinyl acetate. Their K value (25° C., cyclohexanone, DIN 53,726) should be from 45 to 55.

The polymethyl methacrylate usually used by the skilled worker is a homopolymer of methyl methacrylate or a copolymer thereof with up to 10% by weight, based on the copolymer, of vinyl acetate, acrylates of $C_1$-$C_8$-alkanols flow index MFI, determined according to DIN 53,735 (230° C./3.8 kg) is in general from 0.1 to 3.0. These polymers are generally prepared by free radical polymerization of the ethylenically unsaturated monomers at from 30 to 150° C. by mass, solution or emulsion polymerization with subsequent drying. Such polymers are generally known, for example from Houben-Weyl, Methoden der organischen Chemie, Volume E20, 1987, pages 1115-1125, 1041-1062 and 1141-1174.

Suitable polyamides have a K value of from 65 to 80, measured in $H_2SO_4$ at 25° C. according to DIN 53,727. They are usually polymers which are derived from lactams having from 7 to 13 ring members, such as ε-caprolactam, ε-capryllactam or ε-laurolactam, for example polycaprolactam (nylon 6), and polyamides which are obtained by reacting dicarboxylic acids with diamines. Examples of these are polyhexamethyleneadipamide (nylon 66), polyhexamethylenesebacamide (nylon 610) or polyhexamethylenedodecanamide (nylon 612). Examples of suitable dicarboxylic acids are alkanedicarboxylic acids of 5 to 12, in particular 6 to 10, carbon atoms and terephthalic acid and isophthalic acid, as well as any mixtures of these acids. Examples of diamines are alkanediamines of 4 to 12, in particular 4 to 8, carbon atoms, as well as m-xylylenediamine, p-xylylenediamine, hydrogenated derivatives thereof, bis(4-aminophenyl)methane, bis(4-aminocyclohexyl)methane or 2,2-bis(4-aminophenyl)-propane or mixtures thereof. Because of the good solubility, copolymers are preferred, for example a copolyamide of from 30 to 40% by weight of adipic acid, from 15 to 20% by weight of hexamethylenediamine, from 30 to 35% by weight of 4,4'-dicyclohexylmethylenediamine and from 15 to 20% by weight of ε-caprolactam or ε-aminocaproic acid. The preparation of these known polymers is part of general technical knowledge; cf. Römpp, Chemielexikon, 8th Edition, pages 2861, 3058 and 3267, or EP-A-129 195 and EP-A-129 196.

The polyetherdiols are known per se, for example from Kunststoff-Handbuch 7 (1983), 42–44. Examples are polyethylene oxide, polypropylene oxide or polytetrahydrofuran or copolymers thereof having two terminal hydroxyl groups. They are prepared in a known manner by, in general, anionic polyaddition; cf. for example N.G. Gaylord, High Polymers, Vol. 13, New York 1963, Part I. Polyetherols which are grafted to increase the reactivity with ethylene oxide are of minor importance. Polyetherdiols generally have a molecular weight of from 300 to 3,000, which corresponds to a K value of from 25 to 60, measured in dimethylformamide at 25° C. according to DIN 53,726. Preferred molecular weights are from 800 to 2,200, corresponding to a K value of from 20 to 50.

The polyethers used are furthermore, for example, polyethylene oxide, polypropylene oxide or polytetrahydrofuran. Polyethers usually have a K value of from 20 to 50, measured in dimethylformamide at 25° C. according to DIN 53,726. They are generally known from Encyclopedia auf [sic]Polymer Science and Technology, Volume 6, 1967, page 103 et seq., Volume 9, 1968, page 668 et seq. and Volume 13, 1970, page 670 et seq.

Preferred polyester resins are monomer-free unsaturated polyester resins. These are known condensates of polybasic, in particular dibasic, carboxylic acids and esterifiable derivatives thereof, in particular anhydrides thereof, which can be linked by an ester bond to polyhydric, in particular dihydric, alcohols and may contain additional radicals of monobasic carboxylic acids or monohydric alcohols. Examples of starting materials are maleic acid, fumaric acid, phthalic acid, terephthalic acid, maleic anhydride, phthalic anhydride, isophthalic anhydride, ethylene glycol, propylene glycol, butane-1,4-diol or neopentylglycol. In this context, monomer-free means that these UP resin are not dissolved in monomers suitable for crosslinking, such as styrene.

Suitable polyesterdiols are condensates, which have two terminal OH groups, of dicarboxylic acids with [sic]adipic acid or isophthalic acid with diols, for example butane-1,4-diol, hexane-1,6-diol or neopentylglycol.

The molecular weight range of the polyesterdiols which can be used is in general from 300 to 5,000. A molecular weight of from 800 to 2,500, corresponding to a K value of from 30 to 55, measured in dimethylformamide at 25° C. according to DIN 53,276, is preferred. These polymers and their preparation are generally known from Kunststoff-Handbuch 7 (1983), 54–62 and DE 1 268 842.

Polyurethanes which are free of salt groups are known addition polymers based on polyetherdiols or polyesterdiols, isocyanates, such as hexamethylene diisocyanate or 2,4-diisocyanatodiphenylmethane, and possibly bifunctional or trifunctional chain extenders which are prepared by conventional processes (Kunststoff-Handbuch, Karl-Hanser-Verlag, Volume 7, 1966). Suitable starting materials are mentioned in detail further below. Low molecular weight condensates (K value of from 25 to 60, measured in dimethylformamide at 25° C. according to DIN 53,726) are preferably used. Crosslinked polyurethanes are of minor importance.

The phenacrylates used according to the invention and known per se are preferably prepared by subjecting bisphenol A glycidyl ethers esterified with acrylic acid or methacrylic acid to an addition reaction with terephthalic acid. The K values of the polymers are in general from 30 to 55 (in cyclohexane at 25° C. according to DIN 53,726).

The solvent (S'), which has a boiling point below 100° C. at atmospheric pressure, is usually miscible with water in any ratio. It is preferably a solvent which is inert toward isocyanate. Acetone, tetrahydrofuran and methyl ethyl ketone are suitable. (S') is preferably identical to (S). The concentration of the polymer (P) in the solvent (S') is not critical. It may be from 5 to 60, preferably from 20 to 55, % by weight, based on the solution.

Regarding the novel process itself, the following may be stated specifically:

The aqueous polyurethane dispersions are prepared in a conventional manner by reacting (a) dihydroxy compounds having a molecular weight of from 500 to 5,000, (b) diisocyanates and, if required, (c) chain extenders having at least 2 hydrogen atoms which are reactive toward isocyanate groups and a molecular weight of less than 300 in the melt or, preferably, in the presence of a water-miscible, inert organic solvent (S) which boils below 100° C. to give a prepolymer having terminal isocyanate groups, then reacting the prepolymer, if necessary diluted with (further) solvent (S), with (d) salts, which are usually water-soluble and may be dissolved in water, of aliphatic aminocarboxylic or aminosulfonic acids which generally have one or more, preferably two, hydrogen atoms which are reactive toward isocyanate groups, for example in the form of NH or OH groups.

Instead of the aminocarboxylic or aminosulfonic acid, which lead to anionic polyurethane anionomers [sic], tertiary amines or salts thereof can also be used. They generally contain one group, preferably two groups, having at least one hydrogen atom which is reactive toward isocyanate groups, for example in the form of NH or OH groups. These cationic salts lead to cationic polyurethane ionomers. A solution of the polymer (P) in a solvent (S') boiling below 100° C. is then added to the resulting ionomer which contains salt groups and is preferably dissolved in the solvent (S), the mixture obtained is dispersed by adding water and, if necessary, stirring and, if required, the solvent or the solvents (S) and (S') is or are removed by distillation.

In general, emulsifier-free polyurethane dispersions are obtained. In a preferred process variant, the polymer (P), that [sic]is dissolved in (S'), is mixed with the prepolymer before the addition of the salts (d). In this variant, the polymer (P) must of course be free of hydrogen which is capable of reacting with the isocyanates used.

Suitable dihydroxy compounds (a) having a molecular weight of from 500 to 5,000 are the known polyesters, polyethers, polythioethers, polylactones, polyacetals, polycarbonates and polyesteramides having 2 terminal hydroxyl groups. Dihydroxy compounds whose molecular weight range is from 750 to 3,000 are preferred. Mixtures of these relatively high molecular weight dihydroxy compounds with one another can of course also be used.

Examples of suitable aliphatic, cycloaliphatic and aromatic diisocyanates (b) are butane 1,4-diisocyanate, hexane 1,6-diisocyanate, 2,2,4- and 2,4,4-trimethylhexamethylene diisocyanate, cyclohexane diisocyanate, methylcyclohexane diisocyanate, isophorone diisocyanate, 4,4'-diisocyanatodiphenylmethane, 4,4'-diisocyanatodicyclohexylmethane, toluene 2,4- and 2,6-diisocyanate and industrial isomer mixtures thereof. The molar ratio of the (cyclo)aliphatic to the aromatic diisocyanates is advantageously from 1:1 to 1:6.

Suitable chain extenders (c) having at least two hydrogen atoms which are reactive toward isocyanate groups, a molecular weight of less than 300 and no salt groups are the conventional glycols, such as ethylene glycol, propylene glycol, butane-1,3-diol, butane-1,4-diol, hexanediol, neopentylglycol, cyclohexanediol, 2,2-bis(4-hydroxycyclohexyl)propane, 2,2-bis(4-hydroxyethoxyphenyl)propane diethylene glycol or dipropylene glycol, diamines, such as ethylenediamine, piperazine, isophoronediamine, toluenediamine or diaminodiphenylmethane, such as [sic]aminoalcohols, hydrazine and, if desired, also water.

Suitable water-soluble salts (d) of aliphatic aminocarboxylic or aminosulfonic acids are described in, for example, DE-A 20 34 479 or DE-A 19 54 090. These are preferably the alkali metal salts, in particular the sodium or potassium salts, of the adducts of lower aliphatic diprimary diamines, for example ethylenediamine, with unsaturated carboxylic acids, such as (meth)acrylic acid, crotonic acid or maleic acid, and alkali metal salts of lysine. Compounds having two hydrogen atoms bonded to different nitrogen atoms and having only one salt group in the molecule, i.e. compounds which render the product dispersible but not too hydrophilic and which furthermore are suitable for chain extension are generally preferred. The alkali metal salts of the adducts of propane sulfone with aliphatic diprimary diamines are also very suitable. They are generally used in amounts such that the polyurethane obtained contains from 0.02 to 1% by weight of salt-like groups.

Suitable tertiary amines or salts thereof are tertiary amines which additionally contain 2 hydroxyl or 2 primary or secondary amino groups in the molecule.

The isocyanate groups and the hydroxyl and amino groups which are reactive toward isocyanate should be used in about equivalent molar ratios. The ratio of the number of isocyanate groups to the total number of hydrogen atoms reactive in the [sic]isocyanate should be from 0.9:1 to 1.2:1, preferably from 1.0:1 to 1.1:1.

The dihydroxy compounds having a molecular weight of from 500 to 5,000 (a), diisocyanates (b), chain extenders having a molecular weight of less than 300 (c) and water-soluble salts of aliphatic aminocarboxylic acids or aminosulfonic acids or tertiary ammonium salts (d) are used in molar ratios such that the ratio of component (a) to the sum of the diisocyanates (b) and to the sum of the chain extenders (c) and the component (d) of a : b : (c+d) is from 1:2:1 to 1:14:13, particularly advantageously from 1:4:3 to 1:10:9.

To accelerate the reaction of the diisocyanates, the conventional and known catalysts, such as dibutyltin dilaurate, tin(II) octoate or 1,4-diazabicyclo(2.2.2)-octane, may be present.

The aqueous polyurethane dispersions are prepared in a conventional manner by reacting dihydroxy compounds having a molecular weight of from 500 to 5,000 with the diisocyanates and, if required, the chain extenders having a molecular weight of less than 300 and no salt groups in the melt or in the presence or absence of a water-miscible, inert organic solvent boiling below 100° C., under atmospheric or superatmospheric pressure, to give a prepolymer having terminal isocyanate groups.

The aromatic and (cyclo)aliphatic diisocyanates to be used according to the invention can be reacted, either as a mixture with one another or in succession in the stated order, with the dihydroxy compounds and the chain extenders. According to the different reactivities of the two diisocyanates, it is frequently sufficient to use the diisocyanates as a mixture with one another. If they are reacted in succession with the dihydroxy compounds and the chain extenders, it is advantageous to use first the aromatic and then the (cyclo)aliphatic diisocyanate in order to ensure that the reaction product has middle segments of aromatic diisocyanate and chain extender and terminal (cyclo)aliphatic isocyanate groups. In the stepwise reaction of the two diisocyanates, it is not essential completely to react the aromatic diisocyanate before adding the (cyclo)aliphatic diisocyanate; instead, the cyclo(aliphatic) diisocyanate can often be added at a time when only some of the aromatic diisocyante has reacted.

The resulting polyurethane prepolymer having terminal aliphatic or cycloaliphatic isocyanate groups is, if necessary, further diluted with a water-miscible solvent which boils below 100° C. and is inert toward isocyanate groups. The polymer (P) dissolved in (S') and the water-soluble salts of aliphatic aminocarboxylic or aminosulfonic acids or the tertiary ammonium salts may be added to said prepolymer, in general at from 20 to 50° C. If necessary, the compounds (d) may be added in the form of an aqueous solution. The reaction of these salts with the isocyanate groups takes place spontaneously and preferably leads to chain extension.

In general, a solution of the polymer (P) in a solvent (S') is added to a solution of the polyurethane thus obtained.

Suitable solvents (S) are polar solvents which are inert toward isocyanate, have boiling points of less than 100° C. at atmospheric pressure and are miscible with water in any ratio, for example acetone, tetrahydrofuran or methyl ethyl ketone.

Finally, water is stirred into the mixture thus obtained, and, if required, the organic solvent (S) or (S') is removed by distillation. Finely divided stable dispersions which, if required, can be concentrated by evaporation are obtained. In general, solvent-free latices having a solids content of up to 60, preferably from 30 to 50, % by weight are prepared.

The aqueous polyurethane dispersions have high adhesive strength, in particular initially, high heat distortion resistance and high final strength. As adhesives, they can be processed in a simple manner by conventional methods since they have an open assembly time of from 6 to 12 hours. The air-dried films of the dispersions have an open assembly time which is advantageous even for contact adhesives. The polyurethane dispersions enable the introduction of various polymers, in particular polyamides, which have decisive advantages also for use in the coating materials sector. Thus, polyamides can be used and processed as aqueous systems in the polyurethane dispersions described and therefore have advantages over solvent-containing coatings.

The symbols used in the Examples below have the meanings stated below:

ADA = Adipic acid
B 14 = Butane-1,4-diol
DBTL = Dibutyltin dilaurate
TDI = Toluylene diisocyanate
HDI = Hexamethylene diisocyanate
PUD = Na salt of the Michael adduct of acrylic acid and ethylenediamine (as a chain extender containing salt groups)

We claim:

1. An aqueous polyurethane dispersion, obtained by reacting (a) dihydroxy compounds having a molecular weight of from 500 to 5,000, (b) diisocyanates and, optionally, (c) chain extenders which do not have any salt groups, having at least two hydrogen atoms which are reactive toward isocyanate groups and a molecular weight of less than 300, in the melt or in the presence of a water-miscible, organic solvent which is inert toward isocyanate groups and boils below 100° C. to give a prepolymer having terminal isocyanate groups;

reacting the prepolymer with (d) salts of aminosulfonic acids, or aliphatic aminocarboxylic acids or tertiary ammonium salts, which salts (d) contain one or more hydrogen atoms which are reactive toward isocyanate, the molar ratio of the components a: b: (c+d) ranging from 1:2:1 to 1:14:13;

admixing the polyurethane and from 5 to 60 parts by weight, based on 100 parts by weight of the polyurethane, of a polymer selected from the group consisting of polyvinyl acetate, polyvinyl chloride, polymethyl methacrylate, polyamide, polyether, polyetherdiol, polyester resin, polyester diol, polyurethane free of salt groups, phenacrylate and a mixture of at least two of the substances which is dissolved in a water-miscible solvent inert toward isocyanate and boiling below 100° C; and then dispersing the polyurethane of the admixture in water.

2. The aqueous polyurethane dispersion of claim 1, wherein the polymer is admixed with said polyurethane before addition of component (d) as a reactant with said prepolymer.

3. A process for the preparation of an aqueous polyurethane dispersion by reacting (a) dihydroxy compounds having a molecular weight of from 500 to 5,000, (b) diisocyanates and, optionally, (c) chain extenders, which do not have any salt groups, having at least two hydrogen atoms which are reactive toward isocyanate groups and having molecular weight of less than 300, in the melt or in the presence of a water-miscible, organic solvent which is inert toward isocyanate groups and boils below 100° C. to give a prepolymer having a terminal issocyanate groups;

reacting the prepolymer with (d) salts of aminosulfonic acids, or aliphatic aminocarboxcyclic acids or tertiary ammonium salts, which contain one or more hydrogen atoms which are reactive towards isocyanate, the molar ratio of components a: b: (c+d) ranging from 1:2:1 to 1:14:13;

admixing from 5 to 60 parts by weight, based on 100 parts by weight of the polyurethane, of a polymer selected from the group consisting of polyvinyl acetate, polyvinyl chloride, polymethyl methacrylate, polyamide, polyether, polyetherdiol, polyester resin, polyesterdiol, polyurethane free of salt groups phenacrylate and a mixture of at least two of these substances which is dissolved in a water-miscible solvent inert toward isocyanate and boiling below 100° C. with the polyurethane; and dispersing the polyurethane component of the admixture in water.

4. A method of preparing an adhesive, comprising:
formulating the adhesive with the polyurethane dispersion of claim 1.

5. A method of forming a coating material, comprising:
formulating the coating material of the polyurethane dispersion of claim 1.

* * * * *